United States Patent [19]

Moore et al.

[11] Patent Number: 5,665,784
[45] Date of Patent: Sep. 9, 1997

[54] RECOVERY OF POLYESTER FROM SPENT FILM

[75] Inventors: Tony C. Moore; Carl S. Nichols; Joseph C. Tucker, all of Charlotte, N.C.

[73] Assignee: Wellman, Inc., Charlotte, N.C.

[21] Appl. No.: 550,196

[22] Filed: Oct. 30, 1995

Related U.S. Application Data

[62] Division of Ser. No. 945,675, Sep. 16, 1992, Pat. No. 5,523,329, which is a continuation of Ser. No. 723,814, Jul. 1, 1991, abandoned.

[51] Int. Cl.$^6$ ............................. C08J 11/04; C08K 5/07
[52] U.S. Cl. ..................... 521/48; 521/48.5; 521/46.5; 521/42.5
[58] Field of Search .................. 521/48, 48.5, 41.5; 134/10, 64 P

[56] References Cited

U.S. PATENT DOCUMENTS

| | | | |
|---|---|---|---|
| 3,108,082 | 10/1963 | Riehl et al. | 521/48 |
| 3,503,904 | 3/1970 | Dietz et al. | 521/48 |
| 3,511,657 | 5/1970 | Smith | 134/40 |
| 3,647,422 | 3/1972 | Wainer | 521/48 |
| 3,806,316 | 4/1974 | Lewkowitz et al. | 8/103 |
| 3,873,314 | 3/1975 | Woo et al. | 134/42 |
| 3,928,253 | 12/1975 | Thornton et al. | 134/10 |
| 3,952,053 | 4/1976 | Brown, Jr. et al. | 562/483 |
| 4,003,880 | 1/1977 | Sidebotham et al. | 528/487 |
| 4,003,881 | 1/1977 | Sidebotham et al. | 528/487 |
| 4,078,916 | 3/1978 | Gerber et al. | 521/48 |
| 4,118,187 | 10/1978 | Sidebotham et al. | 521/48 |
| 4,137,393 | 1/1979 | Sidebotham et al. | 521/48 |
| 4,138,374 | 2/1979 | Currie | 521/48 |
| 4,150,977 | 4/1979 | Phillips | 75/417 |
| 4,227,881 | 10/1980 | Fono | 8/102 |
| 4,602,046 | 7/1986 | Buser et al. | 521/48 |
| 4,870,110 | 9/1989 | Mehra et al. | 521/48 |

FOREIGN PATENT DOCUMENTS 1432000   8/1989   United Kingdom.

*Primary Examiner*—Paul R. Michl
*Assistant Examiner*—Olga Asinovsky
*Attorney, Agent, or Firm*—Bell, Seltzer, Park & Gibson, P.A.

[57] ABSTRACT

Spent photographic film having at least a polyester base, blue dye, and a polyvinylidene binder layer, and from which the photographic emulsion has been removed, is treated to recover usable polyester. The spent photographic film is heated in cyclohexanone at a temperature sufficient and for a time sufficient to remove both polyvinylidene and dye compounds from the polyester base. The recovered polyester may then be mixed with virgin polyester and extruded to produce a polyester product comprising in part recovered polyester and in part virgin polyester.

3 Claims, No Drawings

RECOVERY OF POLYESTER FROM SPENT FILM

This application is a divisional of application Ser. No. 07/945,675, filed Sep. 16, 1992, now U.S. Pat. No. 5,523,329, which is a continuation of Ser. No. 07/723,814, filed Jul. 1, 1991 now abandoned.

FIELD OF THE INVENTION

The present invent elates to a method of recovering usable polyester from spent photographic film. More particularly, the present invention relates to the recovery of usable polyester from spent X-ray film containing blue dye and a polyvinylidene chloride binder layer.

BACKGROUND

Polyethylene terephthalate (polyester) is a thermoplastic polymer having high tensile strength, nearly equal to that of steel. Additionally, films of polyester are unusually resistant to tearing. Polyester has numerous applications in a variety of products, including fabrics, packaging films, recording tapes, and soft-drink bottles. Polyester is also a standard film base for photographic use and particularly for films that use a silver halide photographic emulsion.

Polyester with its strength and tear-resistance properties is a high-demand product. Limited production capability and availability of the raw materials for producing polyester further increase the demand for this product. Because of this high demand for polyester, especially in a climate of increased environmental awareness, there is a need for a method of recycling polyester into useable products. One major source of raw material is recovered polyester bottles. Another potential source is photographic film.

There are many types of photograph film, but all have the same general characteristics. Photographic film in general consists of a support layer, such as glass, a plastic sheet, or paper, coated with an emulsion layer, usually a suspension of silver halide crystals in gelatin. The emulsion layer provides the light-sensitive layer in which the picture is formed.

The composition of the film support layer is dependent upon the particular use of the film. For example, when improved dimensional stability is required, the film support may consist of one of a variety of polymeric materials, including polyester.

The emulsion layer is basically a suspension of silver halide crystals in gelatin, prepared by adding a solution of silver nitrite to a solution of alkali halides in gelatin. The emulsion is coated on the support layer and is set and dried according to the specific use for the film. Many films have more than one coating, including X-ray film which is coated on both sides. Before the emulsion is coated on films, a substratum or "sub" is applied to assure good adhesion of the gelatin layer.

X-ray film, a type of photographic film, is potentially an enormous source of recyclable polyester. The medical community alone generates several million pounds of spent X-ray film each year. The composition of X-ray film, however, has thus far precluded successful recycling incentives. As in other types of photographic film, X-ray film is typically formed of a polyester film base which supports the photographic silver halide emulsion layer. To promote adhesion, X-ray film often contains a sub binding layer of polyvinylidene chloride (PVDC), which adheres well to both the photographic emulsion and to the polyester base. In addition, a blue dye is often included in the X-ray film, apparently because some radiologists prefer the appearance and contrast the blue tint gives the developed X-ray images. Additionally, recovered polyester X-ray film is often found mixed with other films such as acetate.

Currently, the photographic emulsion alone can be successfully removed from the X-ray film by any one of a variety of known desilvering process. The PVDC and blue dyes, however, present an obstacle to the complete and successful recovery of the polyester base. When the desilvered polymeric base is recycled in the presence of the PVDC, the PVDC causes severe yellowing of the polyester in extrusion and can also cause corrosion of the extruding equipment. Further, the blue dye limits the polyester's use to products that are noncolorsensitive.

Because of these difficulties, most desilvered film is landfilled. If both the PVDC and the blue dye could be removed, the spent X-ray film would provide a major source of a usable polyester product, especially in the production of polyester fiber.

Various prior techniques for recovering polyester from photographic film have been attempted. For example, U.S. Pat. No. 3,647,422 to Wainer teaches the use of sodium hydroxide baths for the recovery of silver and polyester. This process melts the polyester base which can then be reworked into the desired shape. U.S. Pat. No. 3,928,253 to Thornton et al. also teaches a process for the recovery of polyester; aqueous monoethanolamine is used to strip the silver halide photographic emulsion from the film's polyester base. Another technique, taught in U.S. Pat. No. 4,150,977 to Phillips, involves the use of enzymes such as protease, amylase and lipase. The focus of all of these techniques, however, is the recovery of the silver component of the photographic emulsion. None of these patents address the problem caused by the presence of PVDC or the blue dye.

Other patents which teach the recovery of polyester from photographic film do recognize the problem the presence of PVDC raises. These patents, however, require complex processes for the recovery of PVDC, including the use of multiple solvents and multiple steps. Further, none address the additional problems raised by the presence of blue dye. For example, the technique taught in U.S. Pat. No. 3,873,314 to Woo et al. utilizes a polar aprotic solvent in a series of steps to dissolve the PVDC-containing polymer. U.S. Pat. No. 4,078,916 to Gerber et al. teaches the use of a combination of various solvents, particularly those of aromatic compounds. U.S. Pat. No. 4,602,046 to Buser teaches the use of a caustic alkali under condition of high shear to achieve separation.

These references are all examples of attempts made to recover polyester from photographic film. Various factors hinder the effectiveness or feasibility of any of these techniques for the complete recovery in the presence of both PVDC and blue dye. For example, all of these techniques are limited to recovery of polyester from silver or PVDC; none address the additional complications presented by the prevalent practice of incorporating dye compounds into the photographic film. Additionally, even where the PVDC problem is addressed, the references require complicated processes, involving multiple steps and multiple solvents. None provide for the removal of PVDC and blue dye in one step with one solvent. These limitations render these processes both ineffective and unfeasible for the recovery of polyester from photographic film.

OBJECT OF THE INVENTION

It is an object of this invention to provide an efficient and feasible method for the recovery of usable polyester from spent photographic film, and in particular from spent X-ray film containing blue dye and a PVDC binder layer. It is a further object of the invention to provide a method for the recovery of polyester from spent photographic film that provides for recycling the reagent utilized in the method. It is still a further object of this invention to provide a method for producing polyester products from the recovered polyester base of the photographic film and to produce a polyester product comprised in part of recovered polyester and in part of polyester supplied from a separate source.

SUMMARY OF THE INVENTION

The present invention is a method for recovering usable polyester from spent photographic film. More particularly, the invention comprises a method for recovering usable polyester from spent X-ray film containing blue dye and a PVDC binder layer. The method comprises the step of heating the spent film, from which the photographic emulsion has been removed, in cyclohexanone. This removes both the dye compounds and the PVDC from the polyester base in a simple and efficient process. This also removes other common contaminants found with the film, such as acetate, polystyrene, and polyvinyl chloride (PVC), which come from other films.

In addition, the present invention provides a method for producing a polyester product from the polyester base recovered from the spent photographic film, especially a polyester product from a mixture of the recovered polyester and virgin polyester. The products may be fibers, films, or any other product that may be produced from a recovered polyester.

DETAILED DESCRIPTION OF THE INVENTION

The present invention provides an effective and efficient method for recovering usable polyester from spent photographic film which has at least one coating of an organic binder layer, such as polyvinylidene chloride (PVDC), and dye compounds. The method is particularly useful for the recovery of polyester from spent X-ray film.

Prior to recycling in accordance with the present invention, the photographic emulsion layer is removed from the spent photographic film in any one of the ways known in the art. The spent photographic film, from which the photographic emulsion has been removed, is placed in cyclohexanone. The cyclohexanone with the photographic film is then heated a temperature sufficient and for a time sufficient to remove both the dye compounds and the PVDC from the polyester base. In a preferred embodiment, the cyclohexanone is heated to a temperature of at least about 140° C. for a period of at least about one hour.

After removal of the dye compounds and PVDC by heating, the polyester base is removed from the cyclohexanone and dried for a time sufficient to remove any absorbed cyclohexanone from the polyester base. For example, the base may be dried at a temperature of at least 170° C. for at least five hours to insure removal of any absorbed cyclohexanone. After the polyester base has been removed from the cyclohexanone, the cyclohexanone solution may be cooled to precipitate any additional polyester which may have dissolved in the cyclohexanone solution during heating. Any precipitated polyester so recovered can then be further recycled utilizing the claimed method. The resultant film contains no more than 0.22% by weight cyclohexanone, 2% by weight of the original blue dye, and 60 ppm of PVDC.

The method has the additional advantage of providing for recycling the cyclohexanone used during the process. After heating the photographic film in cyclohexanone, the cyclohexanone takes on a blue tint due to the removal of dye compounds from the film. After removing the film from the now blue cyclohexanone solution, the solution may be distilled to purify and recover the cyclohexanone. The purified cyclohexanone can then be reused in the recovery method.

The recovered polyester is sufficiently pure to be suitable for use as a source for making fiber or other polyester articles. For example, the resultant dried film is directly usable without further processing at a twenty-five percent (25%) level with virgin polyester for the extrusion of fibers. The term virgin polyester refers to polyester that has not been previously used, such as that prepared from the condensation reaction of a dicarboxylic acid and a dihydroxy alcohol, and in particular from the reaction of terephthalic acid and ethylene glycol.

The method for making a polyester fiber comprises mixing the recovered polyester base with the virgin polyester, and extruding the mixture. It is particularly useful for making polyester fiber comprised of about 25% by weight of the recovered polyester base with about 75% by weight of virgin polyester. The resultant fiber contains no more than 0.06% by weight cyclohexanone, 0.5% by weight of the original blue dye and 15 ppm by weight PVDC.

The invention can be further understood from the following examples.

EXAMPLE 1

Three kilograms of blue, PVDC-coated X-ray film which were desilvered by methods known in the art were boiled in 30 liters of cyclohexanone for one hour at 153° C. After decanting the hot cyclohexanone, 7.5 liters of cyclohexanone were added to the film for a rinse. After the rinse, the film was removed from the cyclohexanone and placed in a vacuum oven at 170° C. for five hours. The resultant dried weight of the clear film was 2.82 kgs. Residual cyclohexanone in the amount of 0.22% was measured on the film.

To test visually for any remaining PVDC, the film was treated with a caustic solution which discolors PVDC. Only a small amount of discoloration occurred, indicating that most of the PVDC was extracted.

Analytically, the amount of PVDC remaining was determined by an analysis of the percentage of chlorine and silver on the film before and after the treatment. Elemental analysis of the as-received film gave 186 ppm total chlorine and 80 ppm silver. The dried clear film gave 29 ppm total chlorine and 42 ppm silver. From this it is estimated that 15% (40 ppm PVDC) of the PVDC remained on the film after extraction.

The solution was allowed to cool overnight. Then the solution was filtered using an 18.5 cm Buchner funnel with Watman Type 4 filter paper. The filtrate was dried under the same conditions as the film, and 63 grams of filtrate was recovered. Analysis of the filter residue gave 305 ppm chlorine and 704 ppm silver.

The filtered blue solution was then distilled in a 20-liter Rotovap to recover the cyclohexanone, recovering 70 grams of solids from the distillation. Analysis of the solids gave 1824 ppm chlorine and 219 ppm silver.

The resultant solvent recovered in the distillation contained no blue color or any other significant contaminants and was usable in further extractions. The amount of blue dye in the recovered film was compared to the original amount by dissolving the samples in meta-cresol and comparing the visible absorption. The amount of blue dye remaining was 2.0%.

The recovered PET film was then mixed with virgin polyester polymer from Fiber Industries, Post Office Box 31331, Charlotte, N.C. 28231, and extruded to produce a fiber. $TiO_2$ was added to give a 0.3% level in the fiber. No optical brightener was used.

As is well known to persons in the art of textile dyeing, the color of a textile is rated in accordance to various standards. The color may be judged on a grayness/brightness index, identified by the letter "L." The range for this index is 1 to 100, with 100 indicating bright white color and the lower numbers indicating darker and grayer colors. A second index evaluates the greenness/redness of a fabric and is indicated by the letter "a." On this scale, a negative number indicates a greener fabric while a positive number indicates a redder fabric. Lastly, a yellow/blue index, identified by the letter "b," may be used to evaluate the color of textiles. The positive numbers on this scale indicate the presence of a yellow color while negative numbers indicate the presence of a blue color.

As demonstrated in Table 1 below, three fiber samples were analyzed and compared using the L, a and b index standards. The resultant color values for the extruded undrawn and uncrystallized fibers are shown in Table 1. A control fiber was formed from polyester produced by Fiber Industries. The control fiber did not have any blue dye or PVDC impurities. Two sample fibers were prepared from a mixture of recovered and virgin polyester. One sample contained 12.5% by weight recovered polyester and 87.5% by weight virgin polyester; the second sample contained 50% by weight recovered polyester and 50% by weight virgin polyester. All three samples were tested utilizing the different index values.

These measurements were all obtained with a HunterLab LabScan colorimeter, as available from Hunter Associates Laboratory Inc., 11491 Sunset Hills Road, Reston, Va. 22090. As can be seen from Table 1, the control showed very low a and b values. In comparison, the fibers extruded from the mixtures of recovered and virgin polyester showed an increase in the b value, indicating no blue dye, and only a slight increase in the a value, indicating only slight amounts of PVDC.

TABLE 1

| Fiber Color Results | | | |
|---|---|---|---|
| Sample | L | a | b |
| 100% bright control | 87.18 | 0.42 | 6.71 |
| 12.5% film | 83.85 | 0.84 | 7.17 |
| 25.0% film | 84.88 | 0.82 | 7.89 |

EXAMPLE 2

3 kilograms of a different blue, PVDC-coated X-ray film which were desilvered by methods known in the art were heated in 30 liters of cyclohexanone for one hour at 145° C. After decanting the hot cyclohexanone, 7.5 liters of cyclohexanone were added to the film for a rinse. After the rinse, the film was removed from the cyclohexanone and placed in a vacuum oven at 200° C. for two hours. The resultant dried weight of the film was 2.43 kgs. Elemental analysis of the as-received film gave 52 ppm total chlorine and 34 ppm silver. The dried clear film gave 23 ppm total chlorine and less than 2 ppm silver. Of the original PVDC, 44% (32 ppm PVDC) remained on the film.

As before, a filtrate and solids were recovered from the blue solution. A total of 94 grams of filtration residue was recovered; analysis indicated that the filtrate contained 119 ppm chlorine and 135 ppm silver. A total of 105 grams of the solids was recovered containing 229 ppm chlorine and 142 ppm silver.

As before, the dried film was mixed with virgin bright polymer and color measurements were made. The results are in Table 2.

TABLE 2

| Fiber Color Results | | | |
|---|---|---|---|
| Sample | L | a | b |
| 100% bright control | 85.63 | 0.33 | 7.29 |
| 12.5% film | 86.07 | 0.23 | 7.83 |
| 25.0% film | 84.88 | 0.82 | 7.89 |

In the specification, there have been disclosed typical preferred embodiments of the invention and, although specific terms have been employed, they have been used in a generic and descriptive sense only and not for purposes of limitation, the scope of the invention being set forth in the following claims.

That which is claimed is:

1. A polyester fiber comprising;

polyester;

cyclohexanone present in an amount greater than 0% up to about 0.06% by weight based on the weight of the polyester;

blue dye present in an amount greater than 0% up to 0.5% by weight based on the weight of the polyester; and polyvinylidene chloride present in an amount greater than 0% up to about 15 ppm by weight based on the weight of the polyester.

2. A polyester fiber according to claim 1 comprising an amount of about 25% by weight recovered polyester and an amount of about 75% by weight virgin polyester.

3. A polyester product comprising:

polyester;

cyclohexanone present in an amount greater than 0% up to about 0.22% by weight based on the weight of the polyester;

blue dye present in an amount greater than 0% up to about 2% by weight based on the weight of the polyester; and polyvinylidene chloride present in an amount greater than 0% up to about 60 ppm by weight based on the weight of the polyester.

* * * * *